United States Patent

[11] 3,552,725

[72] Inventor Bartow Ray
 McLean, Va.
[21] Appl. No. 811,410
[22] Filed Mar. 28, 1969
[45] Patented Jan. 5, 1971
[73] Assignee Future Products Development Corporation
 a corporation of Virginia

[54] ACCELERATION UNITS
 5 Claims, 1 Drawing Fig.
[52] U.S. Cl. .................................................. 261/24,
 261/119, 261/120; 210/242
[51] Int. Cl. ..................................................... C02c 5/04,
 B01f 3/04
[50] Field of Search ............................................ 261/120,
 119, 24; 210/15, 218, 242

[56] References Cited
UNITED STATES PATENTS

| 115,572 | 6/1871 | Clark | 261/119 |
| 2,073,441 | 3/1937 | Blunk | 210/15 |
| 3,335,082 | 8/1967 | Ullrich | 210/15 |

FOREIGN PATENTS

| 26,306 | 3/1907 | Great Britain | 261/119 |

Primary Examiner—Tim R. Miles
Attorney—Plumley, Tyner and Sandt

ABSTRACT: A device for accelerating evaporation and oxidation in sewage systems comprising a frame, a cylindrical housing slidably contained in the frame, a motor driven fan located within the housing and a floatable hood attached to the lower end of the housing whereby the inlet space between the air inlet and the water level may be maintained at a constant level.

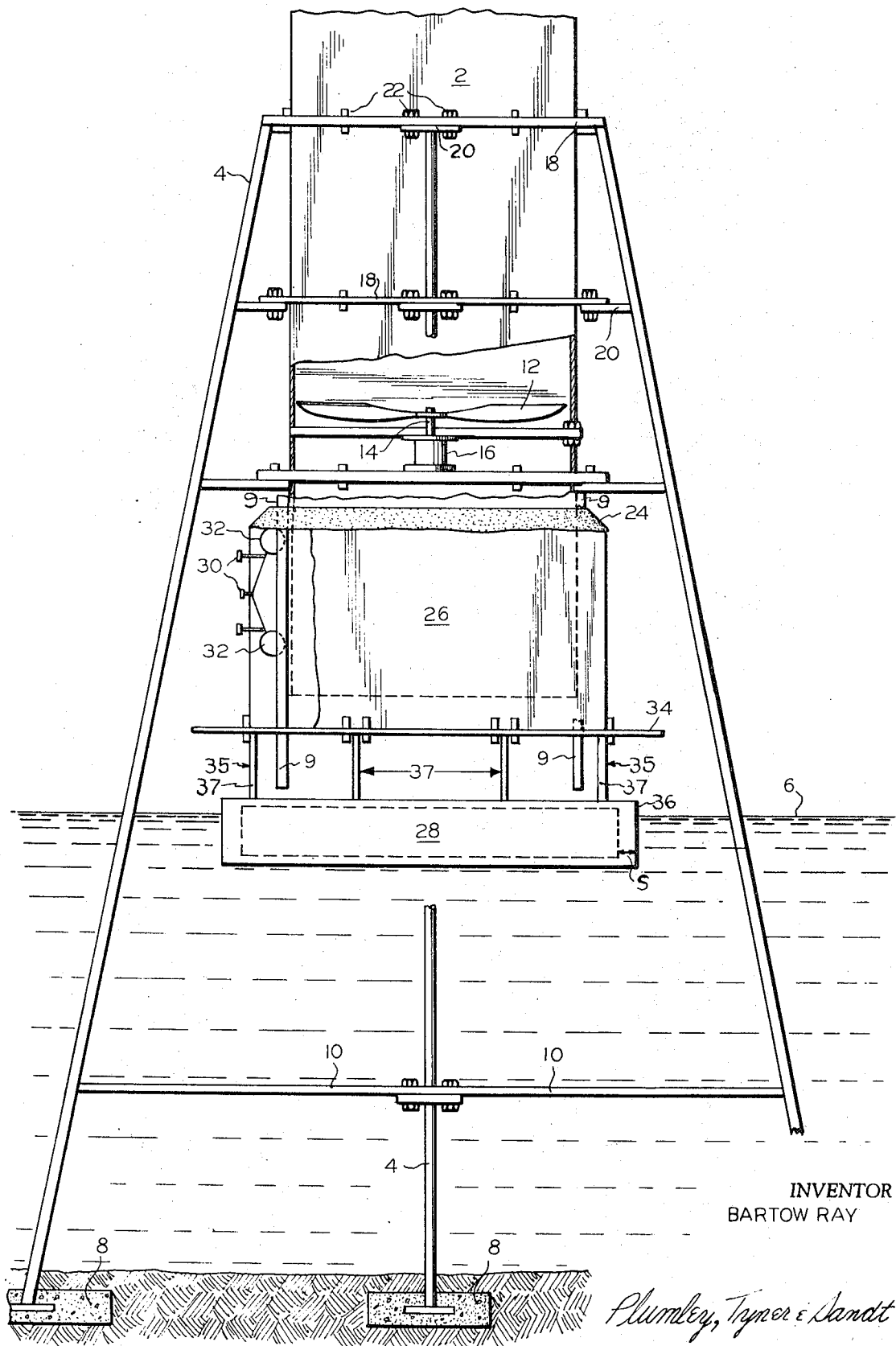

ACCELERATION UNITS

This invention relates to sewage disposal systems, more particularly, to systems used to break down sewage through an activated sludge oxidation process wherein bacteria convert organic material in the sewage into liquid and gases which are further purified by evaporation, filtration, etc.

In oxidation cells or ponds adapted to convert organic waste material into readily dispersible liquids and gases the primary means of conversion is aerobic and anaerobic bacteria which exist in the sewage liquid. The aerobic group requires dissolved oxygen for their existence and accordingly, are concentrated at the upper level of the sewage depth. The anaerobic group derives oxygen from nitrates, sulfates, and other organic compounds in the sewage and is concentrated in the lower depths of the sewage pond. In order to facilitate the digestion of organic materials, it is necessary to continuously provide free oxygen to the aerobic group. This is a naturally occuring process through absorption from the air above the sewage liquid level and can be accelerated by mechanically agitating the liquid. Additionally, it is necessary to further purify the gases and liquids which are produced in the bacterial digestion by evaporation, that is by carrying them away from the sewage pond for dissemination in the atmosphere. Both of these functions require a continuous circulation of air above the liquid level. By providing continuous air circulation over the liquid, the gases are carried away and new supplies of oxygen containing air are continuously present for feeding the aerobic bacteria. Additionally, since circulation of the air removes moisture laden (liquid containing) air and replaces it with relatively dry air, the evaporative process for removing liquids produced by the digestion, is facilitated.

It can thus be seen that in sewage disposal systems utilizing oxidation cells in the activated sludge treatment of sewage, it is necessary to provide continuous circulation of air. In many cases, natural wind actions and solar radiation facilitate the evaporative and aerative process; however, in locations where natural winds are sporadic or practically nonexistent, mechanical devices must be utilized to provide air circulation. In those areas having air currents, these currents are not dependable and generally must be supplemented by mechanical air circulation.

Accordingly, it is the primary object of this invention to provide a device for promoting circulation of air above sewage oxidation ponds.

Another object is to provide an air circulation device which will effectively promote evaporation of liquids, removal of gases, and dissolution of oxygen.

Still another object of this invention is to provide the subject device which is stable in all wind currents and which is adapted to accommodate varying water levels in sewage pond.

Still another object is to provide a device which as nearly as possible, duplicates natural air current action in an efficient and economical manner.

In the past these problems have been treated by placing fans along the bank of a sewage pond to direct a horizontal flow of fluid across or into the water surface. These units, as can be expected, are inefficient since they do not stimulate natural air currents and since it would take a large number of fans positioned almost adjacent one another encircling a pond, in order to effectively aerate the total surface.

It should be pointed out that other devices for aerating sewage systems have provided fans in a housing above the sewage liquid; however, these fans are not adapted to accommodate varying heights of water and are generally merely intended to aerate the liquid by forcing air down onto and into the liquid surface, rather than across the liquid. Thus, while these units may promote aeration, they do not effect improved evaporation.

Another group of devices which may be considered similar in ultimate function are humidifiers where in a fan above a liquid surface draws air and moisture up away from the liquid and disperses it into the atmosphere. It can be appreciated herein that aeration will not be achieved and that again natural air current cannot be simulated nor can the unit be adjustable with the height of the liquid surface.

In view of the deficiences of these known devices and in view of the objects desirable in a sewage treatment system, the present invention effects the desired ends in an improved and novel manner by providing a frame and housing containing a fan above a water level surface adapted to draw air across the water level and up through the housing disseminating it high into the atmosphere with adjustable means to keep the space between the air inlet and liquid at a constant distance. This not only facilitates aeration, but also facilitates removal of gases and evaporation to remove liquids.

The invention may better be understood by reference to the drawing wherein the improved aeration and evaporation acceleration unit of this invention is illustrated in a side view partially broken away.

In the FIG. 2 represents a cylindrical housing which is maintained in a frame formed by slanted vertically extending posts 4 which extend below the water level 6 and are embedded at the base of the pond in concrete or other stabilizing blocks 8. Stability is given the frame by means of crossbars 10 securely attached to the upright posts 4. Four posts 4 are shown in a square pattern, however, other patterns may be utilized depending upon the stability desired and the materials of which the posts are constructed.

The housing 2 contains fan 12 mounted on shaft 14 of motor 16. The housing 2 is securely held in the frame posts 4 by means of cylindrical brackets 18 attached to braces 20 and to the housing 2 on its outer periphery as at 22. A flexible joint 24 of for example rubber of or flexible plastic, is attached to the lower portion of the housing 2 and extends over the uppermost portion of hood 26. The purpose of this adjustable flange is to eliminate intake of air at the lower portion of the housing 2. While rubber or plastic materials can be used, it is clear that any suitable airtight joining materials, such as corrugated paper, plastic, or rubber may be used, provided they are durable. The hood 26 is a vertically adjustable element having the flange 24 at its upper portion and a float 28 at its lower portion. This hood is adjustable by means of tracks 9 and rollers 32 to vertically position the air inlet 35. As was discussed above, efficiency of operation is a determining factor in the operability of fans to circulate air above sewage systems. It has been found that a constant height is required between the center of air intake 35 and liquid surface 6.

The housing 2 extends as shown in dotted lines within the hood 26 in a telescopic arrangement. The purpose of the hood 26 is to maintain the distance between the water level 6 and the air deflector flange 34 (and thus air inlet 35) at a constant height. By way of example, when operating with a one acre pond having the acceleration unit of this invention positioned in the center thereof, a 12—14 inch distance must be maintained between the water level 6 and the flange 34, this gives a 10—12 inch air inlet 35. The inlet 35 extends all around the periphery of hood 26 but can extend less then 360° by putting baffles (not shown) in place to block part of the inlet surface. This 12—14 inch inlet is necessary in order to efficiently maintain an exhaust rate of for example 24,000 to 30,000 cubic feet of air per minute. By approximating these FIGS., it is found that a natural wind velocity of above 5 miles per hour is simulated thereby allowing evaporation rates of the desired gallons of liquid per hour. These rates are achieved using a motor operating at 1,150 or 1,750 r.p.m. In operation, air will be drawn by suction across the surface of the pond and the flange 34 will direct the suction in a generally horizontal plane so that the horizontal motion of air is achieved. The air is horizontally drawn across the surface of the liquid and into the hood 26 and thence into the housing 2. As the distance from the acceleration unit increases the suction plane becomes less horizontal i.e. the suction draws air from higher points as the horizontal distance from the unit increases. This is desirable since aeration units at work in the pond will often discharge liquids to heights of 10—12 feet or more. In the housing 2, as the air is forced upwardly, a spiralling motion (Corielis force)

combines with the chimney flue updraft to cause the moisture saturated air to rise upward, through the height of the cylinder and to dissipate into the atmosphere. When aeration units are operating in the oxidation ponds, the moisture laden air produced from these units will be withdrawn and dissipated and relatively dry air will be replaced, thereby increasing the rate of evaporation. Additionally, by drawing the air across the surface of the liquid, turbulence is increased at the liquid surface and oxygen from the air is dissolved thereby to facilitate aerobic digestion. If the distance between the water level and the intake 35 is not constant, it can be appreciated that the volume of fluids handled, will vary and additionally, and more importantly, the horizontal motion of air over the liquid surface will not be maintained at the desired rate.

Additional features of the novel structure which improve and ensure its operation, are the provision of a waveguide 36 which is concentrically arranged to enclose the float 28. This ensures stability in the frame because it dampens the roll and pitch of the unit due to the action of waves produced by the turbulent air currents. The shield 36 is a cylindrical unit attached by brackets 37 to hood 26 which provides a space S which is relatively calm and in which the float 28 may operate smoothly and safely. The brackets 37 should be flexible so that wave energy is dissipated at the connection between shield 36 and hood 26. In order to ensure the most efficient operation, it is provided for additionally contemplated that a thermal switch will be provided for automatic operation of the unit whenever the natural air velocity drops below 5 miles per hour. Thermal switches are conventionally available and are readily available to those working in the art. When air flow stops the heated element of the switch is no longer cooled and can activate an electrical circuit.

Returning to the device for raising and lowering the air inlet, it is pointed out that the entire hood 26 air inlet 35, float 28, and float shield 36 are raised and lowered when the water level varies because the float 28 rests on the water level. In order to allow smooth operation, frames 9 are formed on the outer portion of the stack 2 and are grooved to receive rollers 32 attached adjustably to hood 26. Thus when the float is lowered, the rollers 32 roll along frame 9 in a downward direction. Adjusting means 30 are provided to vary the force between the roller 30 and the guide 9. This is necessary since continuous operation of the roller will wear the roller and eventually wear on the roller surface may prevent contact between the roller and the groove in guide 9 thereby eliminating the raising and lowering action. It should be understood that other vertically adjustable means could be utilized. The need for adjustment means derives from the varying volume of sewage which must be treated by the pond. The volume varies with time and is more in the day than night, more in the summer than winder etc., so that the pond may vary up to 2 feet in depth.

The materials of construction and size of the components will vary with the size of the pond being treated and should not limit the invention. However, the above noted FIGS. are given by way of illustrative example as having been found operative. Additionally, it can be pointed out that the motor should be a two speed AC motor connected by conventional means to the thermal switch or to a remotely controlled manual switch and adapted to operate fan 12 clockwise or counterclockwise. The housing 2 can be approximately 12 feet high, as well as the frame itself which is on the order of 12—20 feet in height, and 4 to 10 feet in diameter. The number and location of these units in the pond vary with the type of aeration units used and with the nature of the prevailing winds. The materials should be noncorrosive materials and for structural stability, steel is usually required. However, other noncorrosive materials such as copper or plastics could be used. The float 28 can be any buoyant material, e.g. foam plastic and can be a solid disc or a donut-shaped unit. The switch and motor should, of course, be waterproof.

I claim:
1. An evaporation and aeration acceleration unit adapted for use in sewage oxidation ponds comprising a frame, a vertically extended housing in said frame, said housing containing a motor driven fan, a vertically adjustable hood arranged in telescopic relationship with the lower portion of said housing, said hood containing float means at its lower periphery, an air inlet, and means to move the hood vertically along the housing to maintain a constant inlet distance above a liquid level.

2. Unit of claim 1 further comprising airtight flexible connecting means between the upper portion of said hood and the lower portion of said housing.

3. Unit of claim 1 wherein said float is provided with wave dampening means.

4. Unit of claim 1 wherein said motor is activated automatically by means responsive to variations in natural wind velocity.

5. Unit of claim 1 wherein the means to move the hood comprise grooves on the outer periphery of the housing adapted to receive rollers attached to the inner periphery of the hood.